2,834,429
Patented May 13, 1958

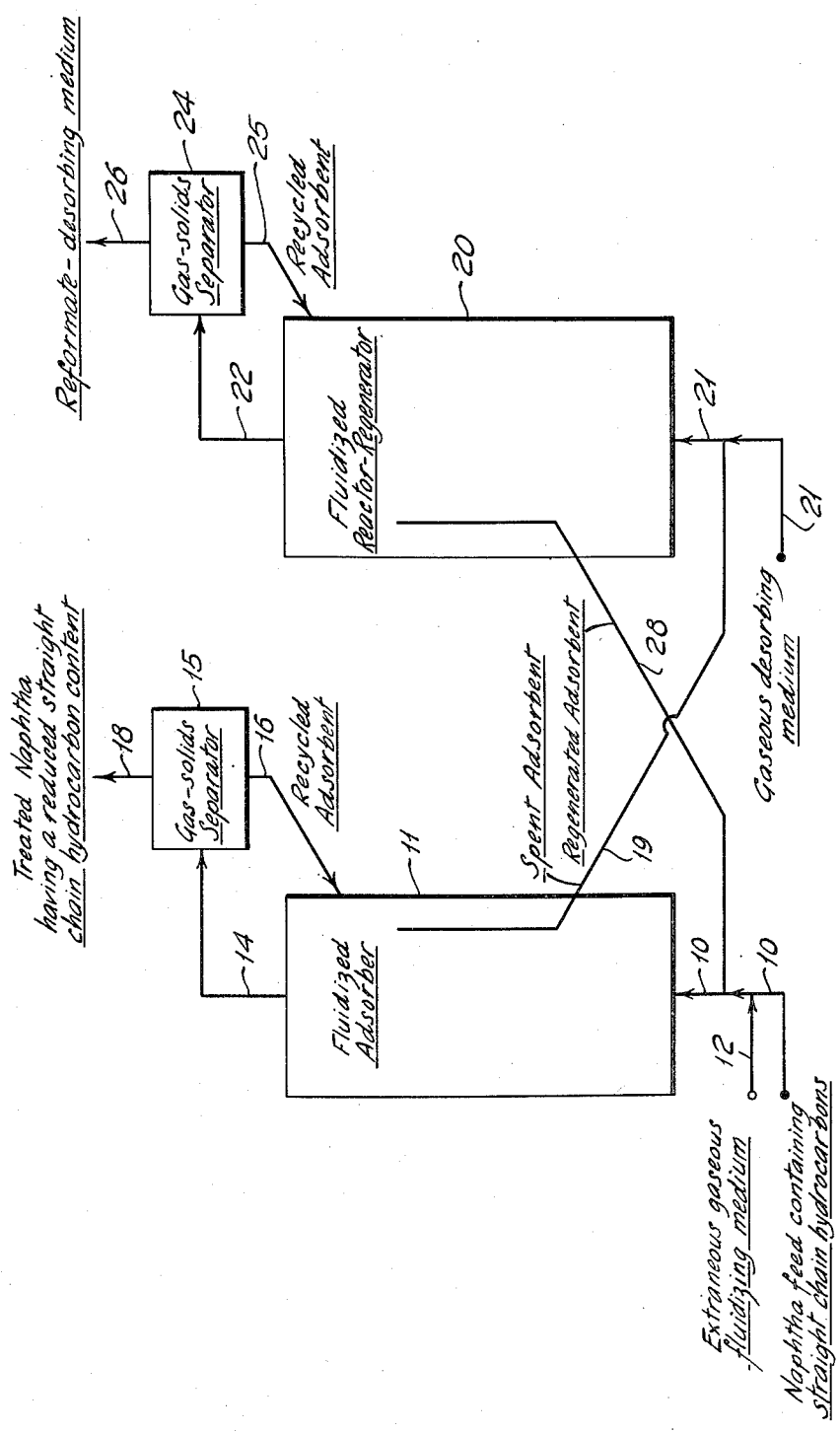

2,834,429
TREATING PROCESS EMPLOYING A FLUIDIZED MASS OF ADSORBENT

Arthur J. Kinsella, Jr., Samuel P. Dickens, and Wiley P. Ballard, Port Arthur, and Benjamin F. Smith, Groves, Tex., assignors to The Texas Company, New York, N. Y., a corporation of Delaware Application October 25, 1955, Serial No. 542,722

2 Claims. (Cl. 183—114.2)

This invention relates to the separation of gaseous or vaporized mixtures. More particularly, this invention relates to a process or composition of matter useful for the separation of gaseous mixtures wherein a finely divided particle-form adsorbent which selectively adsorbs at least one of the components making up the mixture to be separated is employed.

Adsorptive separation processes employing a solid, particle-form selective adsorbent are well known. These processes often possess the disadvantage in that the solid selective adsorbent employed therein undergoes attrition with the eventual loss of the solid adsorbent. To protect the adsorbent from undue attrition and the resulting loss various mechanical devices and handling schemes have been proposed and developed. For example, it has been proposed to encapsulate solid adsorbent material within a protective envelope which is permeable to the mixture to be separated but which possesses sufficient strength and rigidity to protect the thus-encapsulated adsorbent from damage by crushing, attrition and the like. For the most part, however, such schemes have not been completely satisfactory. Moreover, those processes employing rather complicated devices to protect the adsorbent against attrition require a rather high initial expenditure of capital which often cannot be justified on an economical basis. Also, processes suggested heretofore which encapsulate or otherwise protect a solid, particle-form adsorbent adversely affect the capacity of the adsorbent and throughput of the apparatus employing the same. In general, it might be said that moving-bed processes suggested heretofore which employ a friable particle-form selective adsorbent have not been completely satisfactory.

Fluidized adsorptive separation processes have also been proposed. Those processes employing a fluidized adsorbent, particularly when the adsorbent is a friable material, suffer the disadvantage in that adsorbent attrition within the fluidized bed of adsorbent with the resultant creation of very finely divided adsorbent, average particle size of about 10 microns and lower, leads to loss of fluidization and adsorbent from the fluidized bed by entrainment within the gaseous fluidizing medium. Eventually, due to the friable nature of the adsorbent material, substantially all of the adsorbent is reduced in size such that fluidization without excessive elutriation of the adsorbent from the fluidized bed is substantially impossible.

In accordance with one embodiment, the practice of this invention is particularly applicable to a fluidized adsorptive separation process employing an alumino-silicate molecular sieve type adsorbent. Alumino-silicate molecular sieve type adsorbents are relatively fragile materials being made up of porous crystals. Relatively large particles or pellets of these are easily reduced in size by attrition to an ultimate particle size in the range 0.5–5.0 microns, average particle size of about 2.0 microns, and lower. Particles in this size range are substantially impossible or extremely difficult to fluidize, per se. An attempt to fluidize a mass of such particles results in channeling or bubbling of the gaseous fluidizing medium and/or rapid elutriation of the adsorbent particles from the mass being fluidized.

Accordingly, it is an object of this invention to provide a fluidized adsorptive separation process employing finely divided solid, particle-form adsorbent materials which are difficultly fluidizable, per se.

It is another object of this invention to provide a fluidized adsorptive separation process wherein the fluidized adsorbent is an alumino-silicate molecular sieve type adsorbent.

Another object of this invention is to provide a fluidizable admixture containing a finely divided solid, particle-form adsorbent which is difficultly fluidizable, per se.

Yet another object of this invention is to provide a fluidized adsorptive separation process suitable for the handling of finely divided solid adsorbent material, such as a selective adsorbent having a particle size in the range 0.5–5.0 microns, which is difficultly fluidizable or substantially impossible to fluidize, per se.

In at least one embodiment of this invention at least one of the foregoing objects will be achieved.

How these and other objects of this invention are accomplished will become apparent with reference to the accompanying disclosure and drawing which schematically illustrates an adsorptive separation process in accordance with the teachings of this invention.

A treating process in accordance with this invention employs a fluidized mass containing finely divided solid, particle-form selective adsorbent admixed with finely divided other solid material. Despite the fact that the finely divided solid, particle-form adsorbent is made up of particles, such as particles in the size range 0.5–5.0 microns, e. g., average particle size of about 2.0 microns, such that the finely divided solid, particle-form adsorbent, per se, is substantially impossible or difficult to fluidize, in accordance with the teachings of this invention it is possible to fluidize an admixture containing such particle size adsorbent by admixing therewith other finely divided solid material in an amount and in the size range, substantially greater than the average particle size of said adsorbent, sufficient to impart to the resulting admixture fluidization properties; that is, the resulting admixture is able to be maintained as a pseudo-liquid or pseudo-fluid mass of solid, particle-form material in an ebullient state without excessive elutriation of the adsorbent particles.

Any solid, particle-form selective adsorbent can be suitably employed in the practice of this invetnion. The practice of this invention, however, is particularly applicable to those solid adsorbents which are friable or which are easily reduced by attrition to a finely divided powder. Accordingly, silica gel and activated charcoal, both of which are solid friable materials, are advantageously employed in the practice of this invention. Particularly suitable for use in the practice of this invention are the alumino-silicate molecular sieve type solid adsorbents which selectively adsorb one class or molecular type of compounds, such as straight chain hydrocarbons, to the substantial exclusion of other classes of compounds, such as the non-straight chain hydrocarbons. One molecular sieve type adsorbent is an alumino-silicate sold under the trade name Linde Type 13A molecular sieve which preferentially adsorbs aromatic compounds, such as aromatic hydrocarbons, to the substantial exclusion of non-aromatic compounds. A particularly suitable molecular sieve type adsorbent which evidences an adsorptive selectivity for straight chain hydrocarbons (n-paraffins and n-olefins) is a calcium alumino-silicate, apparently actually a sodium calcium alumino-silicate, manufactured by Linde Air Products Company and designated Linde Type 5A molecular sieve. The crystals of this particular calcium alumino-silicate have a pore size or diameter of about 5 Angstrom units, a pore size sufficiently large to admit one molecular type, straight chain hydrocarbons, such as the normal paraffins and the normal olefins, to the substantial exclusion of other molecular types, such as the non-straight chain naphthenic, aromatic, isoparaffinic and isoolefinic hydrocarbons which possess critical molecular dimensions greater than 5° A. units and which, accordingly, cannot penetrate the crystal pores. This particular selective adsorbent is available in various sizes but is a relatively friable material and when employed in a moving bed system this adsorbent is rapidly reduced in size by attrition to a finely divided powder. The aforementioned sodium calcium alumino-silicate manufactured by Linde Air Products Company is also available as a finely divided powder which is substantially impossible to fluidize satisfactorily, per se, the powder having a particle size in the range 0.5–5.0 microns, a bulk density of about 33 lbs. per cu. ft. and a particle density of 1.6 grams per cc.

Generally alumino-silicate molecular sieve type solid adsorbents are very friable materials and when employed in a moving bed system tend to be reduced to an ultimate particle size in the range 0.5–5.0 microns, and lower. However, even particles of this small size are advantageously employed in the process of this invention wherein adsorbent attrition is not a limitation and wherein such finely divided solid adsorbent material can be satisfactorily fluidized by admixing therewith other solid, particle-form materials.

The alumino-silicate molecular sieve type solid adsorbents are made up of porous crystals wherein the pores of the crystals are of molecular dimensions and are of substantially uniform size. Accordingly, the crystal pore size determines which compound or component will be adsorbed within the crystal, i. e., those compounds which have a critical molecular diameter greater than the crystal pore diameter are not able to penetrate the crystal lattice and, accordingly, are not adsorbed, whereas those compounds which have a critical molecular diameter smaller than the crystal pores are able to penetrate the crystal lattice and be adsorbed therein.

Other suitable alumino-silicate molecular sieve type selective adsorbents include the synthetic and naturally occurring zeolites, which, when dehydrated, may be described as crystalline zeolites having a rigid three dimensional anionic network and having interstitial dimensions sufficiently large to adsorb one type of compound to the substantial exclusion of another type of compound. The naturally-occurring zeolite, chabazite, exhibits such desirable properties in that it selectively adsorbs straight chain hydrocarbons to the substantial exclusion of non-straight chain hydrocarbons. Another suitable naturally-occurring zeolite is analcite $NaAlSi_2O_6.H_2O$ which, when dehydrated, and when all or part of the sodium is replaced by an alkaline earth metal, such as calcium, by base exchange yields a material which may be represented by the formula $(Ca,Na) Al_2Si_4O_{12}.2H_2O$ and which after suitable conditioning will adsorb one molecular type, such as straight chain hydrocarbons, to the substantial exclusion of another molecular type, such as non-straight chain hydrocarbons. Naturally occurring or synthetically prepared phacolite, gmelinite, harmotome, and the like or suitable base exchange modifications of these zeolites are also useful as selective adsorbents.

Any suitably sized solid, particle-form material may be employed in admixture with the finely divided selective adsorbent which is substantially non-fluidizable, per se, in order to provide the fluidizable adsorbent-containing admixture in accordance with this invention. The suitably sized additive material contained in the fluidizable admixture of adsorbent and additive material may be such materials as silica gel, finely divided or powdered metals and their solid oxides, or mixtures thereof, e. g., Cr, Fe, Ni, Al, Mo, Cu, Ce, B, Zn, Ca, Si, C, Mn, Ti, clayey materials, talc, various earth minerals and ores, refractory ceramic materials and the like. Suitable additive materials usually have an average particle size in the range 35–60 microns, more or less, comprising particles in the size range 15–85 microns. A particularly suitable additive material is finely divided silica gel having the following particle size distribution, as determined by Roller analysis, set forth in Table I:

TABLE I

| Particle size: | Weight percent |
|---|---|
| 0–20 microns | 16 |
| 20–40 microns | 26 |
| 40–80 microns | 35 |
| 80+ microns | 23 |
| Average particle size 45 microns | |

Another suitable additive material is a clayey material, actually an alumino-silicate commercially available under the trade name Milwhite Clay having a particle size distribution set forth in Table II:

TABLE II

| Particle size: | Weight percent |
|---|---|
| 0–20 microns | 14 |
| 20–40 microns | 21 |
| 40–80 microns | 30 |
| 80+ microns | 35 |
| Average particle size 55 microns | |

The practice of this invention, although generally applicable to the treatment of gaseous mixtures for the adsorptive separation of one or more components therefrom, is particularly applicable to the treatment of hydrocarbon fractions such as petroleum fractions and hydrocarbon synthesis (Fischer-Tropsch) fractions for the adsorptive separation of one or more of the components therefrom. This invention is suitable for the treatment of hydrocarbon fractions containing straight chain and non-straight chain hydrocarbons and wherein the amount of straight chain hydrocarbons is substantial, e. g., in the range 2–35% by volume, and higher, to effect the removal of straight chain hydrocarbons therefrom, thereby upgrading the thus-treated hydrocarbon fraction, as evidenced by octane number increase, as a motor fuel.

Hydrocarbon mixtures which are suitably fractionated by a vapor phase selective adsorption employing a fluidized adsorbent in accordance with this invention include the various petroleum fractions, such as a naphtha fraction, a diesel oil fraction, a kerosene fraction, gas-oil fraction and the like. Particularly suitable for treatment are straight chain hydrocarbon-containing fractions having a boiling point or a boiling range in the range 40–600° F. and higher and containing a substantial amount of straight chain hydrocarbons. More particularly, a petroleum fraction suitable for use in the practice of this invention might have an initial boiling point in the range 40–300° F. and an end point in the range 150–600° F. and might have the following composition:

| Hydrocarbon type: | Percent by volume |
|---|---|
| Naphthenes | 0–75 |
| Aromatics | 0–75 |
| Acyclic saturates (including normal paraffins and isoparaffins) | 1–90 |
| Acyclic unsaturates (including normal olefins and isoolefins) | 0–50 |

Refinery stocks or naphthas having the above-indicated composition and which are suitably treated in accordance with this invention are a wide boiling straight run naphtha, a light straight run naphtha having an end point not substantially greater than 225° F., a heavy straight run naphtha, a catalytically cracked naphtha, a thermally cracked or thermally reformed naphtha, a catalytically reformed naphtha and the like.

The adsorptive separation process in accordance with the teachings of this invention is carried out at any suitable temperature and pressure at which the vaporized feed mixture undergoing adsorptive separation is maintained in the vapor phase. Selective adsorption has been carried out at a temperature in the range 50–900° F. and a pressure in the range 0–600 p. s. i. g. and higher, the temperature and pressure being adjusted with respect to the gaseous or vaporized mixture undergoing treatment so as to maintain the mixture in the gaseous phase during the adsorptive separation operation. When fractionating a hydrocarbon mixture by adsorptive separation it is preferred to carry out the adsorption operation at a temperature in the range 400–750° F. During the adsorptive separation operation the throughput of the gaseous or vaporized mixture through the adsorber containing the fluidized adsorbent is adjusted to fluidize the adsorbent admixture to an ebullient pseudo-liquid state without excessive elutriation or entrainment of the adsorbent admixture in the gaseous effluent leaving the adsorption zone.

The desorption of the adsorbed component from the selective adsorbent can be made at any suitable temperature and pressure, the temperature and pressure being adjusted so that the resulting desorbed material is in the vapor phase. Generally, any suitable desorption temperature may be employed in the practice of this invention. It is sometimes even desirable to carry out isothermal and/or isobaric adsorption-desorption operations. It is preferred, however, to carry out the desorption operation at a relatively elevated temperature, such as a temperature in the range 500–1000° F., usually at a temperature in the range 100–300° F. higher than the adsorption temperature. The desorption temperature should not be excessively high, for example, not greater than 1100–1300° F. in the case of Linde Type 5A molecular sieve since such high temperatures lead to the destruction of the adsorbent material in the fluidized adsorbent admixture, presumably by collapse of the crystal structure.

During the desorption operation a gaseous or vaporized desorbing or stripping medium which serves also to fluidize the adsorbent admixture is employed. Any suitable gaseous stripping medium may be employed. The following materials are exemplary of a suitable gaseous desorbing-fluidizing medium: nitrogen, methane, hydrogen, carbon dioxide, carbon monoxide, flue gas, natural gas, $C_4$ hydrocarbons such as butane and/or isobutane, mixtures of the foregoing, also vaporized normally liquid non-straight chain hydrocarbons readily separable by distillation from the resulting desorbed straight chain hydrocarbons. In general, any gaseous or vaporized material or hydrocarbon fraction which is readily separable, such as by distillation, from the material being desorbed (desorbate) is suitable as the desorbing agent. Like the fluidized adsorption operation, the throughput of the gaseous stripping-fluidizing medium in contact with the adsorbent admixture during desorption is adjusted to maintain the adsorbent admixture in a pseudo-liquid, ebullient fluidized state. Separate adsorption and desorption zones may be employed or, if desired, a single zone alternately employed for adsorption and desorption may be utilized.

Illustrative of the practice of this invention various blends of a powdered alumino-silicate molecular sieve type adsorbent and finely divided additive material were tested for fluidization properties in a glass column. The glass column was fitted with fritted glass distributing plate at its bottom and air was employed as the gaseous fluidizing medium. Before introduction into the fluidization test column the air was dried by contact with Drierite and metered through a small rotameter. The test column was also provided with a rapper to vibrate the fluidization test column, if desired, during the tests.

The powdered alumino-silicate molecular sieve treating agent was mixed in various concentrations in the range 10–60% by weight with the particle-form additive material. The resulting mixtures were mixed by hand until they appeared homogeneous. The resulting homogeneous mixtures were then tested by observing their action in the fluidization test column at increasing air velocities, with and without external vibration.

The following additive materials, admixed with the alumino-silicate molecular sieve adsorbent, were tested to determine the fluidization property of the resulting admixture:

A. Alumino-silicate fluid cracking catalyst having an average particle size of about 34 microns.

B. Alumino-silicate fluid cracking catalyst having an average particle size of about 75 microns.

C. Alumino-silicate fluid cracking catalyst having a particle size in the range 20–80 microns.

D. Alumino-silicate fluid cracking catalyst having a particle size in the range 80 microns and higher.

E. Adsorbol clay having a particle size such that 54% by weight of the clay passes through a 325 mesh screen.

F. Milwhite clay having the following roller analysis in weight percent:

| Particle size: | Weight percent |
|---|---|
| 0–20 microns | 14 |
| 20–40 microns | 21 |
| 40–80 microns | 30 |
| 80+ microns | 35 |

Average particle size 55 microns

G. Silica gel having the particle size distribution set forth in Table I.

The fluidization characteristics of the blends tested are set forth in Table III.

It was observed during the tests that external vibration seemed to assist fluidization of the admixtures of alumino-silicate molecular sieve adsorbent and additive material. Of all the admixtures tested the admixture containing 40% alumino-silicate molecular sieve selective adsorbent and 60% Milwhite clay (additive material F) appeared to be best as adjudged by its ability to fluidize and to retain the molecular sieve adsorbent within the fluidized bed.

Additional tests were also carried out in a bench model fluid bed test unit employing a mixture of 40% alumino-silicate molecular sieve selective adsorbent (Linde Type 5A molecular sieve) and 60% by weight Milwhite clay. There was charged to this test unit a vaporized catalytic reformed naphtha having an 85.9 octane number. Adsorption and desorption operations were carried out isothermally at a temperature of about 525° F. at atmospheric pressure and at a charge velocity to the absorption zone of the fluid test unit of about 2 v./hr./v. amounting to a superficial charge velocity of about 0.12 feet per second.

In all tests it was observed that the alumino-silicate molecular sieve adsorbent when admixed with solid additive material to improve its fluidization properties was retained longer in the test unit than if the same molecular sieve absorbent material was tested under the same conditions in the absence of a finely divided particle-form additive material.

Referring now in greater detail to the drawing there is schematically illustrated therein a particular preferred embodiment of the practice of this invention wherein the solid, particle-form additive material admixed with the finely divided selective adsorbent material also possesses catalytic properties which are brought into play during the desorption of the adsorbed component from the selective adsorbent. Thus the additive material has the dual function of imparting fluidization properties to the adsorbent and acts as a catalytic agent during the fluidized desorption operation. Preferably this catalytic additive material admixed with the selective adsorbent exhibits catalytic reforming activity, that is, is a reforming or isomerization catalyst. Reforming catalysts are well known and comprise such materials as a platinum-containing catalyst (Platforming catalyst), a cobalt-mo-

TABLE III

*Fluidization test results*

BLENDS OF POWDERED ADSORBENT AGENT AND ADDITIVE MATERIALS

| Additive Material, Wt. Percent in Blend | Fluidization without External Vibration | Fluidization with External Vibration |
|---|---|---|
| A | | |
| 100% | Good fluidization | Not tested. |
| 80% | No fluidization until air velocity reached 0.06 ft./sec. Further increase in air velocity resulted in better fluidization. | Do. |
| 60% | Channeling | Violent fluidization starting about 0.1 ft./sec. |
| 40% | do | Channeling. |
| B | | |
| 100% | Good fluidization | Not tested. |
| 80% | Channeling | Fluidization good. |
| 60% | do | Channeling. |
| 40% | do | Do. |
| C | | |
| 100% | Good fluidization | Not tested. |
| 80% | Fluidized at 0.1 ft./sec | Same as without vibration. |
| 60% | Channeled, no fluidization | Channeling. |
| 40% | do | Do. |
| D | | |
| 100% | Poor fluidization, surging | Not tested. |
| 80% | Channeling | Fluidized. |
| 60% | do | Do. |
| 40% | do | Do. |
| E | | |
| 100% | Fluidized poorly at about 0.1 ft./sec. air velocity. | Not tested. |
| 80% | Fluidized poorly at about 0.1 ft./sec. air velocity. Lost fluidity easily and channeled. | Better fluidization. |
| 60% | Channeling | Channeling. |
| 40% | do | Do. |
| F | | |
| 100% | Fluidized poorly | Not tested. |
| 80% | Fluidized at about 0.2 ft./sec | About same. |
| 60% | Fluidization satisfactory. Minimum loss of adsorbent. | Fluidized at about 0.15 ft./sec. Minimum loss of adsorbent. |
| 40% | Channeling | Channeling. |
| G | | |
| 100% | do | Fluidized. |
| 80% | do | Fluidized, but lost adsorbent rapidly. |
| 60% | do | Do. |
| 40% | do | Channeling. | lybdate catalyst, so-called Hyperforming catalyst, a chromia alumina catalyst which may be identified as a Sovaforming or Thermofor catalytic reforming catalyst, a molybdena-alumina catalyst sometimes referred to as a Hydroforming or Orthoforming catalyst. The above-mentioned Orthoforming catalyst comprises a molybdena-alumina catalyst containing a minor amount, e. g., 9–11% by weight, $MoO_3$.

In accordance with the embodiment of this invention schematically illustrated in the drawing, a light naphtha fraction such as a light straight run naphtha or a light catalytic reformed naphtha having a boiling range in the range 40–250° F. and containing straight chain hydrocarbons (n-paraffins) together with non-straight chain hydrocarbons (isoparaffins, aromatics and some cycloparaffins) is introduced via line 10 into fluid adsorber 11 wherein is maintained a fluidized mass containing an alumino-silicate molecular sieve type adsorbent, a Linde Type 5A molecular sieve, which selectively adsorbs straight chain hydrocarbons to the substantial exclusion of non-straight chain hydrocarbons, intimately admixed with a suitably sized particle-form catalytically active additive material, such as a chromia-alumina aromatization catalyst, alone or admixed with other additive material, such as Milwhite clay, to impart fluidization properties to the resulting admixture. The vaporized light naphtha fraction introduced into adsorber 11 via line 10 serves to fluidize the adsorbent-containing admixture therein and to maintain the same in the fluidized condition. If desired, additional or supplementary gaseous fluidizing medium, such as hydrogen, methane or other suitable gaseous diluent, may be supplied to adsorber 11 via lines 12 and 10.

The adsorbent is maintained at a suitable temperature to effect adsorption of straight chain hydrocarbons from the light naphtha undergoing treatment by the adsorbent material within adsorber 11. An operating temperature in the range 350–600° F. is suitable. There is recovered from adsorber 11 as effluent via line 14 a treated naphtha fraction having a substantially reduced straight chain hydrocarbon. This treated naphtha fraction is introduced into gas-solids separator 15 for the separation of any entrained solid, particle-form material from the treated naphtha. The gas-solids separator may comprise any means suitable for effecting separation of finely divided solid particles having a particle size in the range 0.5–75 microns from a gaseous stream entraining the same. Ceramic filters, Cottrell precipitators and the like are suitable means for effecting such a separation. The solid particles separated in gas-solids separator 15, containing some selective adsorbent, is returned via line 16 to adsorber 11. The resulting treated naphtha now substantially free of solid, particle-form material is removed from gas-solids separator 15 via line 18.

During the aforementioned operations a stream of solid particles, selective adsorbent and additive material, is removed from adsorber 11 via line 19 and introduced into fluid reactor-regenerator 20. The solid adsorbent material thus-introduced into reactor-regenerator 20 contains adsorbed thereon straight chain hydrocarbons, e. g. normal paraffins in the molecular weight range $C_5$-$C_9$. Like the operation of adsorber 11, the solid particles thus-introduced into reactor-regenerator 20 are maintained in a fluidized state or as a fluid bed therein by the continuous injection of a gaseous desorbing-fluidizing medium introduced into reactor-regenerator 20 via line 21. The gaseous desorbing-fluidizing medium thus-introduced into a reactor-regenerator may comprise any suitable gaseous medium, such as methane, the normally gaseous hydrocarbons, carbon dioxide, flue gas, carbon monoxide, nitrogen and the like. Preferably, hydrogen is employed as the gaseous desorbing medium.

Reactor-regenerator 20 is advantageously maintained at a temperature level higher than that prevailing in adsorber 11, such as a temperature in the range 700–950° F. If desired, however, both adsorber 11 and reactor-regenerator 20 may be operated substantially isothermally. Also, adsorber 11 and reactor-regenerator 20 may be operated under substantially isobaric conditions, or any suitable operating pressure in the range 0–250 p. s. i. g.

The straight chain hydrocarbons contained adsorbed on the adsorbent introduced into reactor-regenerator 20 are desorbed under the conditions prevailing therein and upon desorption they are catalytically reformed, dehydrocyclized, isomerized or otherwise catalytically reacted (aromatized) due to the presence in reactor-regenerator 20 of the solid catalytic material chromia-alumina aromatization catalyst, which is admixed with the selective adsorbent therein to improve its fluidization properties. Consequently there issues from reactor-regenerator 20 as effluent via line 22 a resulting reformate stream comprising straight chain hydrocarbons admixed with non-straight chain hydrocarbons. This gaseous effluent stream is introduced into gas-solids separator 24 which, like gas-solids separator 15, serves to effect separation of the entrained solid particles from the gaseous stream introduced therein. The recovered solid particles are recycled via line 25 to reactor-regenerator 20. The resulting reformate now substantially free of entrained solid particles is removed from gas-solids separator 24 via line 26.

The resulting regenerated adsorbent material, now substantially free or depleted of adsorbed straight chain hydrocarbons, is continuously removed from reactor-regenerator 20 via line 28 for introduction into adsorber 11 via line 10 to contact additional naphtha for the removal of straight chain hydrocarbons therefrom. The above operations are carried out continuously and simultaneously.

Further illustrative of the practice of this invention a vaporized mixture of straight chain hydrocarbons comparable to the mixture of straight chain hydrocarbons desorbed or otherwise released from the adsorbent introduced into reactor-regenerator 20 and comprising 23% by volume n-pentane, 56% by volume n-hexane and 21% by volume n-heptane was contacted with a particle-form aromatization catalyst comprising $Cr_2O_3$—$MgO$—$Al_2O_3$ at various temperatures and at a space velocity of about 0.4 v./hr./v. at a pressure of about 40 p. s. i. g. and at an $H_2$ recycle rate of 1200 cu. ft. per barrel of feed mixture. The properties of the resulting upgraded product or reformate are set forth in Table IV.

TABLE IV

| | | |
|---|---|---|
| Reaction Temp., °F | 920 | 943 |
| Wt. percent recovery, reformate | 93.8 | 81.3 |
| Bromine No. reformate | 20 | 22 |
| Vol. percent aromatics | 15 | 13 |
| Reformate, ASTM Res. Clear Oct | 60.6 | 57.6 |
| +3 cc. TEL/gal | 80.4 | 80.2 |

For purposes of simplicity and clarity conventional control equipment, valves, pumps, compressors, heaters, coolers, heat exchangers and supplementary gas-liquid, gas-solids and liquid-solids separators, precipitators, fractionators, etc. have for the most part not been illustrated in the drawing. The location and employment of these auxiliary pieces of equipment, such as may be necessary in the practice of this invention, are well known to those skilled in the art.

As is evident to those skilled in the art, many modifications, substitutions and changes are possible in the practice of this invention without departing from the spirit or scope thereof.

We claim:
1. A method of treating a gaseous mixture containing a component to be separated therefrom which comprises introducing said mixture into an adsorption zone provided with a fluidized admixture consisting essentially of about 40% by weight finely divided alumino-silicate molecular sieve type selective adsorbent which selectively adsorbs said component from said mixture, said adsorbent having a particle size in the range 0.5–5.0 microns and an average particle size of about 2 microns, and about 60% by weight of a finely divided solid particle form clayey material having an average particle size of about 55 microns and the following particle size distribution:

Particle size:                                Weight percent
- 0–20 microns _____ 14
- 20–40 microns _____ 21
- 40–80 microns _____ 30
- 80+ microns _____ 35

2. A composition of matter consisting essentially of 40% by weight of a finely divided alumino-silicate molecular sieve type adsorbent having an average particle size of about 2 microns and having a particle size in the range 0.5–5.0 microns and about 60% by weight of a finely divided clayey material having an average particle size in the range of about 55 microns and the following particle size distribution:

Particle size:                                  Weight percent
- 0–20 microns _____ 14
- 20–40 microns _____ 21
- 40–80 microns _____ 30
- 80+ microns _____ 35

References Cited in the file of this patent
UNITED STATES PATENTS

| | | |
|---|---|---|
| 2,306,610 | Barrer | Dec. 29, 1942 |
| 2,391,334 | Nicholson | Dec. 18, 1945 |
| 2,410,284 | Gunness et al. | Oct. 29, 1946 |
| 2,415,756 | Le Roi et al. | Feb. 11, 1947 |
| 2,493,911 | Brandt | June 10, 1950 |
| 2,522,426 | Black | Sept. 12, 1950 |
| 2,523,149 | Scheeline | Sept. 19, 1950 |
| 2,529,289 | Gilliland | Nov. 7, 1950 |
| 2,712,476 | Happel | July 5, 1955 |